(12) United States Patent  (10) Patent No.: US 8,797,416 B2
Hirata  (45) Date of Patent: Aug. 5, 2014

(54) IMAGE PROCESSING APPARATUS AND IMAGE PROCESSING METHOD (75) Inventor: Takashi Hirata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 326 days.

(21) Appl. No.: 13/121,935

(22) PCT Filed: Sep. 30, 2009

(86) PCT No.: PCT/JP2009/005023
§ 371 (c)(1),
(2), (4) Date: Mar. 30, 2011

(87) PCT Pub. No.: WO2010/038447
PCT Pub. Date: Apr. 8, 2010

(65) Prior Publication Data
US 2011/0187889 A1  Aug. 4, 2011

(30) Foreign Application Priority Data

Oct. 1, 2008 (JP) ................. 2008-256861

(51) Int. Cl.
H04N 5/232 (2006.01)
H04N 5/225 (2006.01)
G06K 9/00 (2006.01)

(52) U.S. Cl.
USPC ............. 348/222.1; 348/207.1; 382/118

(58) Field of Classification Search
USPC ............. 348/207.1, 222.1, 333.01; 382/103, 382/115, 118
See application file for complete search history.

(56) References Cited

U.S. PATENT DOCUMENTS

| | | | | |
|---|---|---|---|---|
| 2007/0071316 A1* | 3/2007 | Kubo | | 382/162 |
| 2008/0152226 A1* | 6/2008 | Ryuto | | 382/190 |
| 2008/0240503 A1* | 10/2008 | Okada et al. | | 382/103 |
| 2008/0260255 A1* | 10/2008 | Fukushima et al. | | 382/190 |

FOREIGN PATENT DOCUMENTS

| | | |
|---|---|---|
| JP | 2005-176230 A | 6/2005 |
| JP | 2006-180403 A | 7/2006 |
| JP | 2006-268493 A | 10/2006 |
| JP | 2006-301779 A | 11/2006 |

* cited by examiner

Primary Examiner — Trung Diep
(74) Attorney, Agent, or Firm — Canon U.S.A., Inc. IP Division (57) ABSTRACT In an image processing apparatus, a shooting scene and shooting parameters for each image pickup apparatus that is to be used to pick up an image are set in accordance with a user input. A picked-up image is received from an image pickup apparatus. In accordance with the shooting scene that is set for the image pickup apparatus which has picked up the received image, a threshold of the likelihood of detecting a face region that is included in the shooting parameters for the shooting scene is obtained. A face region is detected from the picked-up image using the obtained threshold of the likelihood of detecting a face region. An image of the detected face region is highlighted and displayed on a display screen.

8 Claims, 7 Drawing Sheets

| SHOOTING SCENE | FACE-REGION DETECTION THRESHOLD | Av VALUE | Tv VALUE | ... |
|---|---|---|---|---|
| WEDDING (ONE-PERSON PHOTOGRAPH) | 1.0 | 1.0 | 1/40 | ... |
| WEDDING (GROUP PHOTOGRAPH) | 0.5 | 1.2 | 1/45 | ... |
| ... | ... | ... | ... | ... |

IMAGE PROCESSING APPARATUS AND IMAGE PROCESSING METHOD

TECHNICAL FIELD

The present invention relates to an image processing apparatus and an image processing method.

BACKGROUND ART

Recently, image pickup systems in which a picked-up image that has picked up by a photographer with a digital camera is displayed on a monitor of a personal computer so that the picked-up image can be checked at the scene have been introduced into photography studios where commemorative pictures and so forth are taken. In such an image pickup system, in order to help a photographer to determine whether or not photographing is successful, a picked-up image that has been obtained by photographing is read, and displayed. In addition, a region of the face of a person shown in the picked-up image is extracted as a face region, and an image of the extracted face region can be displayed on the same screen on which the picked-up image is displayed.

However, regarding extraction of a face region that is performed in the above-mentioned image pickup system, only a predetermined threshold of the likelihood of detecting a face region is used to determine whether or not a face is recognized. For example, in PTL, only a threshold of the area of a skin-colored portion is used. Accordingly, in an image pickup system of the related art, even for different shooting scenes such as a scene in which a person is photographed for a business portrait and a scene in which a group of persons is photographed for a group photograph, face recognition with the same threshold of the detection likelihood is performed. Basically, for a shooting scene such as a scene in which a person is photographed for a business portrait or a scene in which one or two persons are photographed, it is necessary to recognize a face with a high degree of the detection likelihood. In contrast, for a shooting scene such as a scene in which a group of persons is photographed for a group photograph, it is desired in many cases to verify that all of persons which have been photographed are shown in a picked-up image using face recognition with a low degree of the detection likelihood.

CITATION LIST

Patent Literature

PTL 1: Japanese Patent Laid-Open No. 2006-180403

SUMMARY OF INVENTION

The present invention provides an image processing apparatus and an image processing method that can detect a face region using a threshold of the likelihood of detecting a face region which is suitable for a shooting scene.

According to an aspect of the present invention, an image processing apparatus includes the following elements: a setting unit configured to set, in accordance with a user input, a shooting scene and shooting parameters for each image pickup apparatus that is to be used to pick up an image; a receiving unit configured to receive a picked-up image from an image pickup apparatus; a detection unit configured to obtain, in accordance with the shooting scene that is set by the setting unit for an image pickup apparatus which has picked up the image received by the receiving unit, a threshold of a likelihood of detecting a face region that is included in the shooting parameters for the shooting scene, and configured to detect a face region from the picked-up image using the obtained threshold of the likelihood of detecting a face region; and a display unit configured to display an image of the face region which is detected by the detection unit so that the image of the face region is discriminated.

Further features and aspects of the present invention will become apparent from the following detailed description of exemplary embodiments with reference to the attached drawings.

DESCRIPTION OF EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Hereinafter, an embodiment of the present invention will be described with reference to the accompanying drawings.

Figure 1:
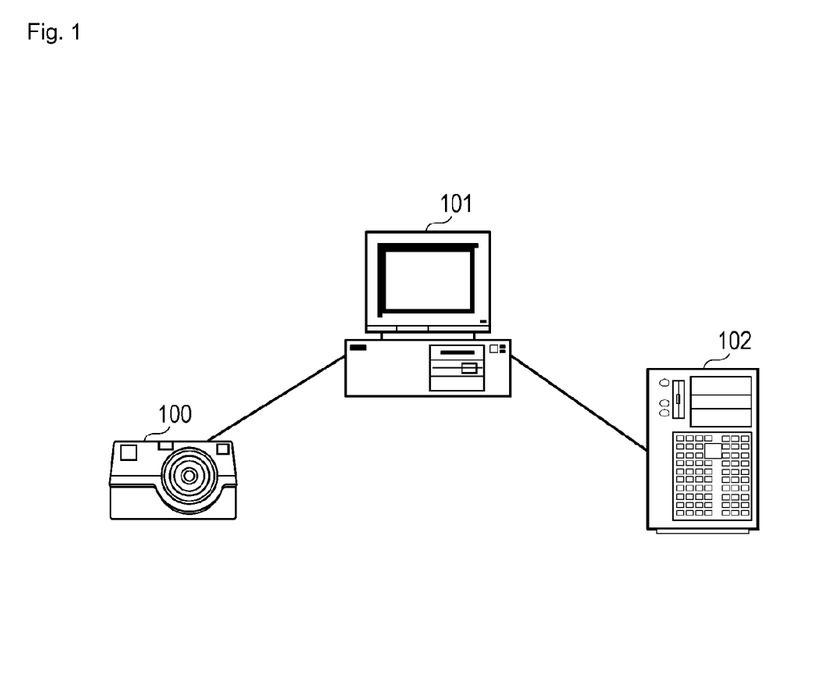
FIG. 1 is a diagram showing an example of a system configuration of an image pickup system.

FIG. 1 is a diagram showing an example of a system configuration of an image pickup system. As shown in FIG. 1, in the image pickup system, a camera 100 that is an example of an image pickup apparatus, a picked-up image checking apparatus 101 that is an example of an information processing apparatus (a computer), and a picked-up image storage apparatus 102 are connected to one another via a network so as to be capable of performing communication. A picked-up image that is picked up by the camera 100 is transferred to the picked-up image checking apparatus 101 via the network. A photographer checks the picked-up image using the picked-up image checking apparatus 101. The checked image is transferred to the picked-up image storage apparatus 102, and managed by the picked-up image storage apparatus 102. Note that, although one camera 100 and one picked-up image checking apparatus 101 are illustrated in FIG. 1, the picked-up image checking apparatus 101 can perform communication with a plurality of cameras 100, and the picked-up image storage apparatus 102 can perform communication with a plurality of picked-up image checking apparatuses 101.

Figure 2:
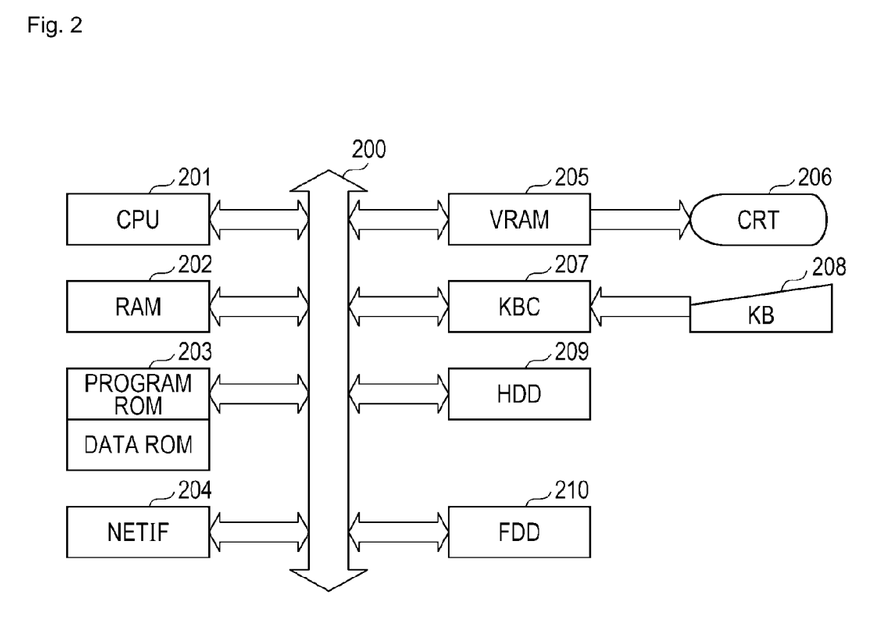
FIG. 2 is a diagram showing an example of a hardware configuration of a picked-up image checking apparatus when the picked-up image checking apparatus is configured using a computer system.

Next, a hardware configuration of the picked-up image checking apparatus 101 when the picked-up image checking apparatus 101 is configured using a computer system such as an information processing apparatus will be described with reference to FIG. 2.

A CPU 201 is a central processing unit that performs control of the computer system.

A RAM 202 is a random-access memory, and functions as the main memory of the CPU 201. Furthermore, the RAM 202 also functions as an area in which a program is executed.

A read-only memory (ROM) 203 includes a program ROM in which programs are recorded, and a data ROM in which information that is necessary when the CPU 201 performs a process in accordance with a program and so forth are recorded. Note that an HDD 209, which is described below, may be used instead of the ROM 203.

A NETIF 204 is a network interface, and performs control and diagnosis of a connection state for performing data transfer between computer systems via the network.

A VRAM 205 is a video RAM. An image that is to be displayed on a screen (display screen) of a CRT 206, which is described below, is loaded into the VRAM 205. The VRAM 205 performs control of displaying the image.

A display device 206 is, for example, a cathode-ray tube display device (hereinafter, referred to as a "CRT" 206).

A KBC 207 is a controller that controls an input signal which is input from a KB 208, which is described below.

The KB 208 is an external input device for accepting an operation that is performed on the computer system by a person who uses the computer system. The KB 208 is, for example, a keyboard.

The HDD 209 is a storage device such as a hard disk. The HDD 209 is used to store an application program, data such as a picked-up image, and so forth.

An FDD 210 is used to read/write data from/into a storage medium. For example, the FDD 210 is used to read the above-mentioned application program from a storage medium.

An input/output bus 200 includes an address bus, a data bus, and a control bus for connecting the above-described units to each other.

The CPU 201 performs a process in accordance with the application program that is stored on the HDD 209 or the like, thereby realizing a function of the picked-up image checking apparatus 101 and a process that is illustrated in a flowchart, which are described below.

Figure 3:
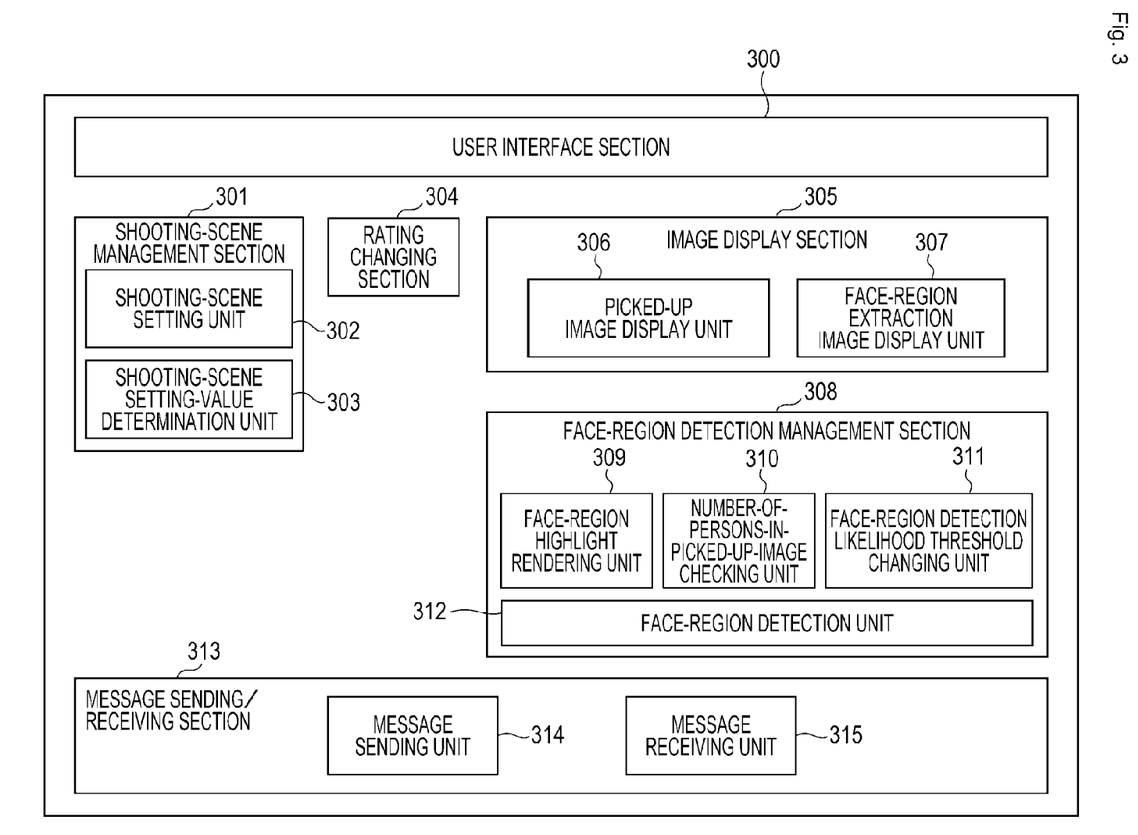
FIG. 3 is a diagram showing an example of a functional configuration of the picked-up image checking apparatus.

FIG. 3 is a diagram showing an example of a functional configuration of the picked-up image checking apparatus 101.

The picked-up image checking apparatus 101 includes a user interface section 300 that accepts an input from a user such as a photographer and that performs display, and a shooting-scene management section 301 that manages various types of parameters including a threshold of the likelihood of detecting a face region. Furthermore, the picked-up image checking apparatus 101 includes a rating changing section 304 that changes a rating of a picked-up image, and an image display section 305 that displays a picked-up image and a face-region extraction image via a user interface. Moreover, the picked-up image checking apparatus 101 includes a face-region detection management section 308 that performs detection of a face region, and a message sending/receiving section 313 that sends/receives a massage (or data) to/from the camera 100 or the picked-up image storage apparatus 102.

Additionally, the shooting-scene management section 301 includes a shooting-scene setting unit 302 and a shooting-scene setting-value determination unit 303. Furthermore, the image display section 305 includes a picked-up image display unit 306 and a face-region extraction image display unit 307. Moreover, the face-region detection management section 308 includes a face-region highlight rendering unit 309, a number-of-persons-in-picked-up-image checking unit 310, a face-region detection likelihood threshold changing unit 311, and a face-region detection unit 312. In addition, the message sending/receiving section 313 includes a message sending unit 314 and a message receiving unit 315.

Figure 4:
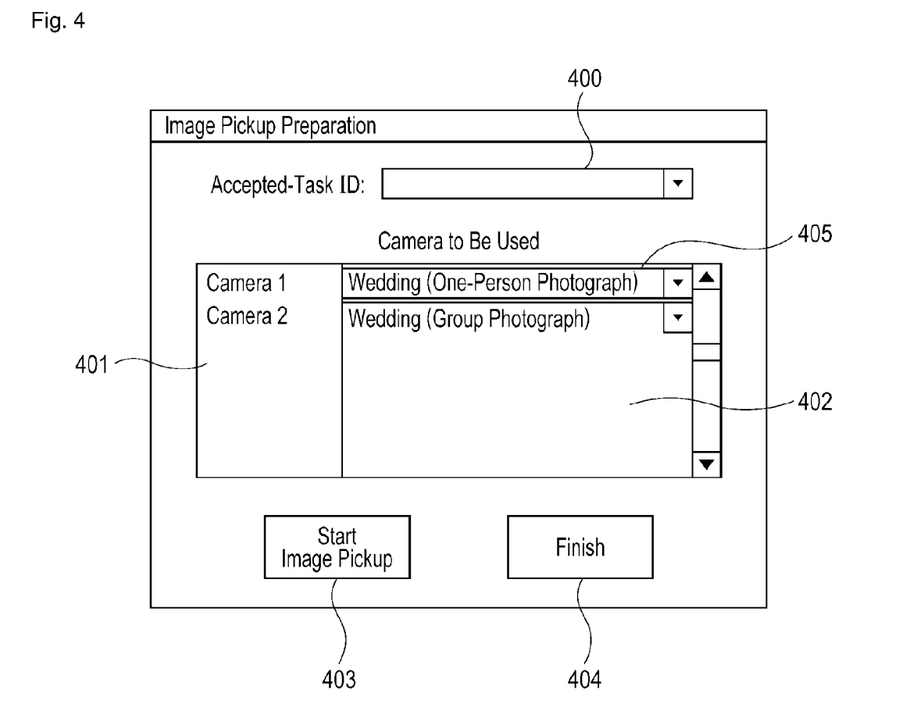
FIG. 4 is an illustration showing an example of a user interface that a user interface section displays.

FIG. 4 is an illustration showing an example of a user interface that the user interface section 300 displays. FIG. 4 shows a user interface (a screen) that is displayed when preparation for image pickup is performed. A user such as a photographer enters an accepted-task ID of a customer whose image is to be picked up into an accepted-task ID text box 400. Next, the user selects a shooting scene for a camera that is displayed in a list of cameras to be used 401. A shooting-scene drop-down list 405 is operated, thereby issuing an instruction for selection of a shooting scene. Then, the user presses an image-pickup start button 403, whereby the shooting-scene setting unit 302 determines some shooting parameters including the threshold of the likelihood of detecting a face region for the selected shooting scene. The determined shooting parameters are sent from the picked-up image checking apparatus 101 to a selected camera. Note that the threshold of the likelihood of detecting a face region is not sent. For example, as shown in FIG. 5 that is described below, the threshold of the likelihood of detecting a face region is associated with the shooting scene (and the camera for which the shooting scene is set), and is held on the HDD 209 or the like.

Figure 5:
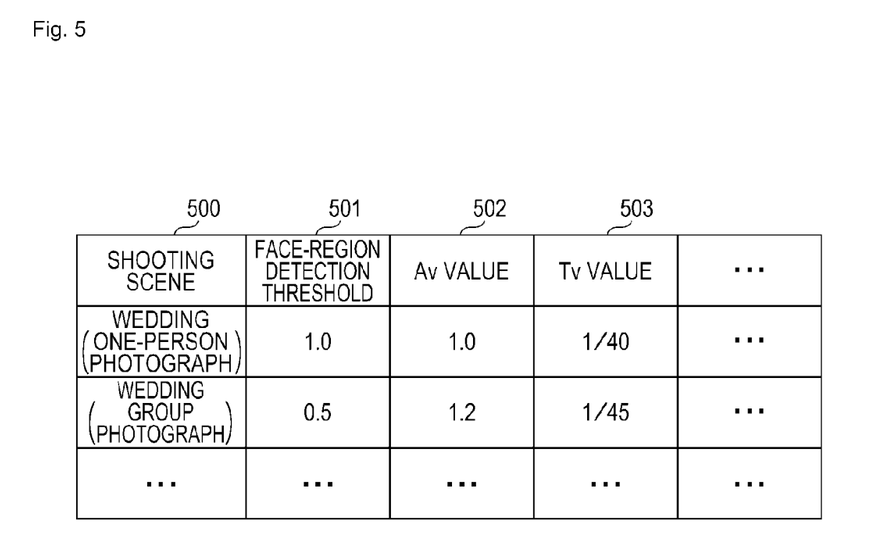
FIG. 5 is an illustration showing an example of a setting-value table that a shooting-scene setting unit manages.

FIG. 5 is an illustration showing an example of a setting-value table that the shooting-scene setting unit 302 manages. The setting-value table has a threshold of the likelihood of detecting a face region 501, an Av value 502, a Tv value, and so forth for each shooting scene 500. Note that, setting items and setting values in the setting-value table are examples, and are not limited thereto.

Figure 6:
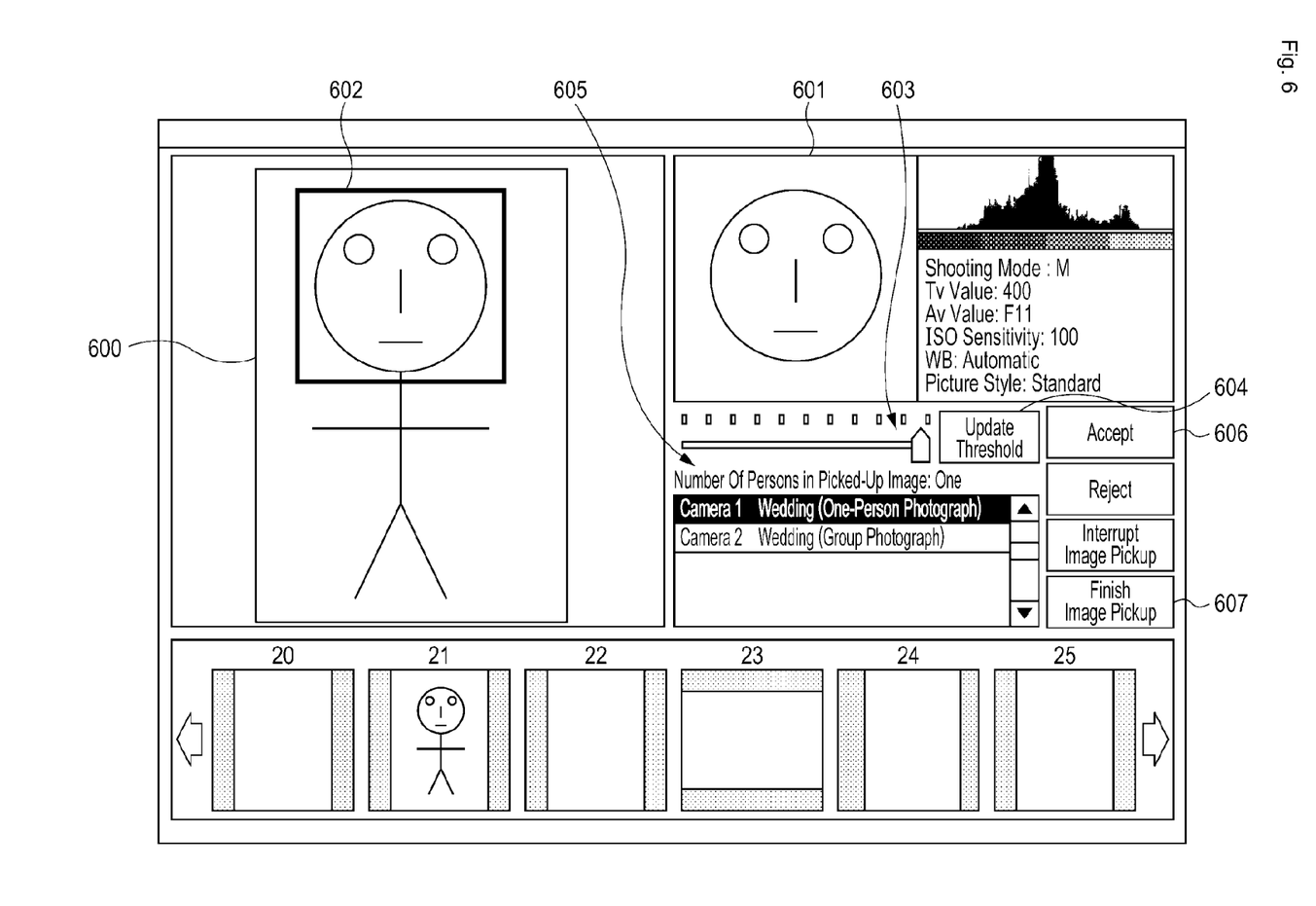
FIG. 6 is an illustration showing an example of a user interface that the user interface section displays.

FIG. 6 is an illustration showing an example of a user interface that the user interface section 300 displays. FIG. 6 illustrates an example of the user interface in a case in which it is desired to set the threshold of the likelihood of detecting a face region to be comparatively high, such as a case in which a wedding (a one-person photograph) is selected as the shooting scene. When a picked-up image that the user such as a photographer has picked up is transferred from the camera to the picked-up image checking apparatus 101, first, the picked-up image is displayed on a picked-up image display panel 600 using an image display process that is performed by the picked-up image display unit 306. Next, the picked-up image checking apparatus 101 causes the face-region detection unit 312 to perform a face-region detection process using the threshold of the likelihood of detecting a face region that is set by the shooting-scene setting unit 302. Then, the face-region extraction image display unit 307 displays, on a face-region image display panel 601, an image that is extracted by the face-region detection unit 312. In this case, the face-region extraction image display unit 307 displays the threshold of the detection likelihood, which was used in the face-region detection process, on a face-region extraction likelihood threshold slider part 603, which is an example of a slider object. Furthermore, in this case, the number-of-persons-in-picked-up-image checking unit 310 calculates the number of persons that are shown in the picked-up image using the number of face regions that were extracted by the face-region detection unit 312, and displays the number of persons that are shown in the picked-up image on a number-of-persons-in-picked-up-image display text 605. Moreover, in order to highlight and display the region that was detected as a face region on the picked-up image, the face-region highlight rendering unit 309 renders, for example, a rectangle on the picked-up image, thereby rendering a face-region highlight indication 602. At a step at which the above-described series of display processes finishes, the picked-up image is transferred from the picked-up image checking apparatus 101 to the picked-up image storage apparatus 102.

Next, when the user such as a photographer desires to change the threshold of the likelihood of detecting a face region and to perform detection of a face region again, the threshold of the detection likelihood is changed by causing the face-region extraction likelihood threshold slider part 603 to slide, whereby the face-region detection likelihood threshold changing unit 311 newly sets the threshold. Detection of a face region is performed again by the face-region detection unit 312. Furthermore, when it is desired to change the threshold of the likelihood of detecting a face region for the shooting scene, the user presses a threshold update button 604 that is an example of a button object. By pressing the threshold update button 604, the shooting-scene setting-value determination unit 303 calculates the average of the current threshold and the newly set threshold, and performs a process of setting the calculated average as a new threshold for the shooting scene. Additionally, when determination of a rating of the picked-up image is performed, the user presses a rating determination button 606. When the rating determination button 606 is pressed, the rating changing section 304 changes the rating, and the picked-up image storage apparatus 102 is notified of change in the rating by the message sending unit 314.

Figure 7:
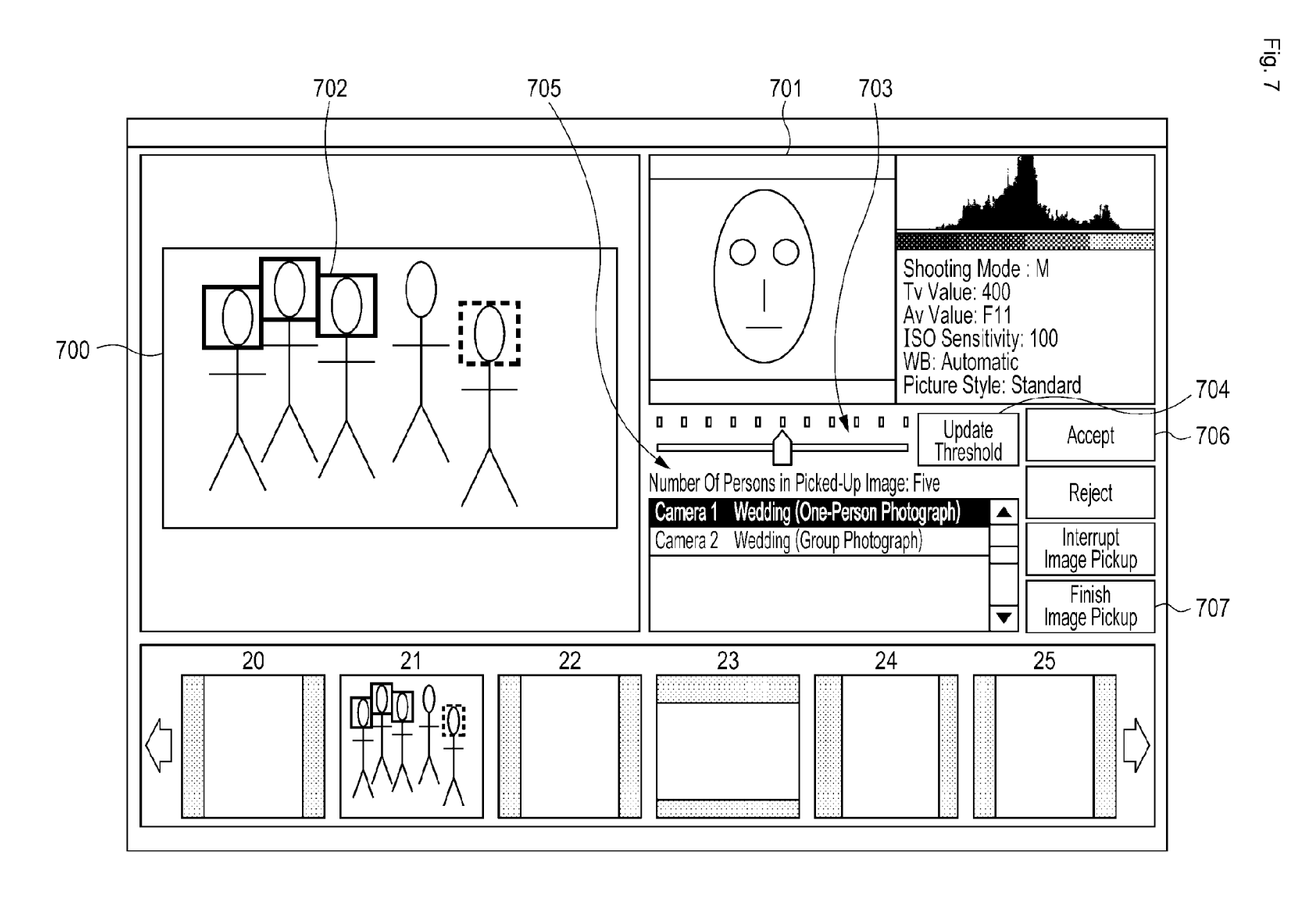
FIG. 7 is an illustration showing an example of the user interface that the user interface section displays.

FIG. 7 is an illustration showing an example of the user interface that the user interface section 300 displays. FIG. 7 illustrates an example of the user interface in a case in which it is desired to set the threshold of the likelihood of detecting a face region to be comparatively low and to check whether or not all persons are reliably shown in a picked-up image, such as a case in which a wedding (a group photograph) is selected as the shooting scene. In this case, the threshold of the likelihood of detecting a face region for the shooting scene is set to be around the median value, a face-region extraction likelihood threshold slider part 703 is positioned at the middle to indicate a certain threshold of the detection likelihood. Furthermore, when a face-region highlight indication 702 is, for example, a rectangle, the shape of the rectangle differs depending on a detected face region. In this embodiment, a rectangle is used. However, bordering using a rectangle is an example, and is not limited to thereto.

Figure 8:
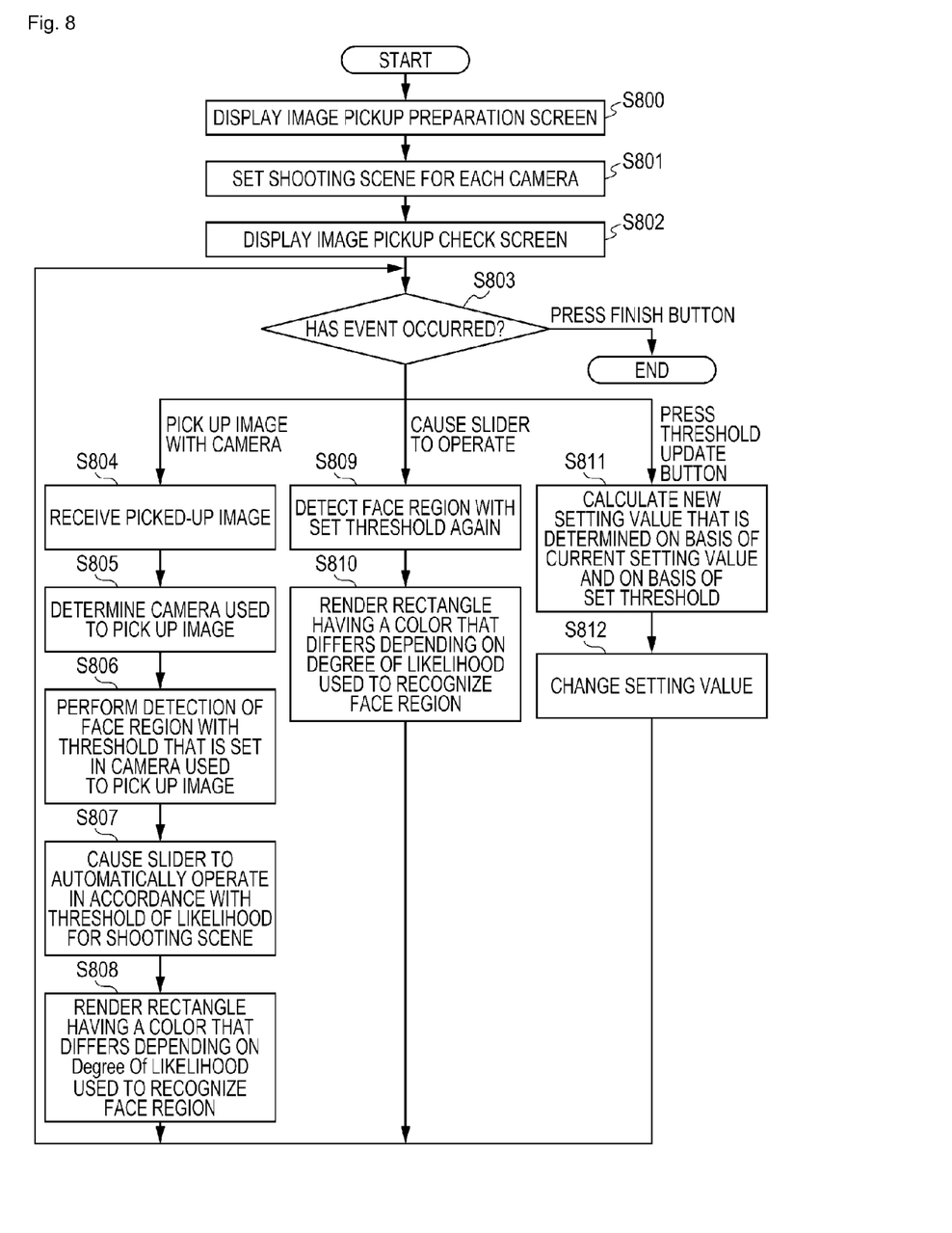
FIG. 8 is a flowchart showing an example of a face-region detection process that is performed by the picked-up image checking apparatus.

FIG. 8 is a flowchart showing an example of the face-region detection process that is performed by the picked-up image checking apparatus 101.

First, after the process starts, in step S800, the user interface section 300 displays an image pickup preparation screen shown in FIG. 4 on, for example, the CRT 206.

Then, in step S801, the user such as a photographer enters an accepted-task ID into the accepted-task ID text box 400, and sets a shooting scene for each camera from a shooting-scene list box 402. The shooting-scene setting unit 302 sets a shooting scene and shooting parameters for each image pickup apparatus that is to be used to pick up an image.

Then, in step S802, the image-pickup start button 403 is pressed, whereby the user interface section 300 displays an image pickup check screen shown in FIG. 6.

After that, in step S803, the picked-up image checking apparatus 101 waits for an event such as image pickup with a camera, pressing of the threshold update button 604, or an operation with the face-region extraction likelihood threshold slider part 603.

When an event in which an image is picked up with a camera occurs in step S803, the message receiving unit 315 receives the picked-up image from a camera in step S804. Note that, when reception of the picked-up image is performed, an Internet protocol (IP) is used. In this case, regarding the version of the IP, both IPv4 and IPv6 can be used. Furthermore, regarding a medium that is practically used as a communication path, a wired medium or a wireless medium can be used. Depending on the IP, in addition, a communication protocol such as a transmission control protocol (TCP), a user datagram protocol (UDP), a hypertext transfer protocol (HTTP), a simple mail transfer protocol (SMTP), a simple network management protocol (SNMP), or a file transfer protocol (FTP) is also used in some cases.

Then, in step S805, the message receiving unit 315 determines, in accordance with a camera ID for identifying a camera or the like, which camera has transferred the picked-up image. The camera ID is included in the received picked-up image or the like, or is received together with the picked-up image or the like.

After that, in step S806, for example, the face-region detection unit 312 obtains, in accordance with a shooting scene that is set in a camera which was used to pick up the image, a threshold of the likelihood of detecting a face region from the setting-value table shown in FIG. 5. Then, the face-region detection unit 312 performs the face-region detection process using the obtained threshold of the likelihood of detecting a face region. Furthermore, the picked-up image display unit 306 displays the picked-up image on the picked-up image display panel 600. The face-region extraction image display unit 307 displays, on the face-region image display panel 601, a face-region extraction image that is extracted by the face-region detection unit 312.

Then, in step S807, the face-region detection likelihood threshold changing unit 311 causes the face-region extraction likelihood threshold slider part 603 to operate in accordance with the threshold of the likelihood of detecting a face region that was used in step S806 (causes the object to move), and notifies the user of the threshold of the detection likelihood. Furthermore, the number-of-persons-in-picked-up-image checking unit 310 checks the number of persons that are shown in the picked-up image on the basis of the face-region extraction image that was extracted by the face-region detection unit 312, and displays the checked number of persons that are shown in the picked-up image on the number-of-persons-in-picked-up-image display text 605. Accordingly, the user can easily grasp the number of persons that are shown in the picked-up image.

Then, in step S808, the face-region highlight rendering unit 309 generates a highlight indication that is to be rendered on the picked-up image. After that, the face-region highlight rendering unit 309 renders the face-region highlight indication 602 on the picked-up image that is displayed on the picked-up image display panel 600. Note that, in this case, the face-region highlight rendering unit 309 changes the form and/or color or the like of the highlight indication for the degree of the detection likelihood that was used to detect a face region, whereby the degree of the detection likelihood that was used to detect the face region can be displayed for the user.

Then, the process returns to step S803, and, in step S803, the picked-up image checking apparatus 101 waits for an event.

When the face-region extraction likelihood threshold slider part 603 is operated in step S803, the face-region detection likelihood threshold changing unit 311 changes the threshold of the detection likelihood in accordance with the operation of the face-region extraction likelihood threshold slider part 603. Accordingly, the threshold of the likelihood of detecting a face region that is set for each shooting scene (for each camera) can be modified into a more appropriate threshold. Then, the face-region detection unit 312 performs the face-region detection process again using the changed threshold of the detection likelihood.

In step S810, the face-region highlight rendering unit 309 generates, on the basis of a detected face region, a highlight indication that is to be rendered on the picked-up image. After that, the face-region highlight rendering unit 309 renders the face-region highlight indication 602 on the picked-up image that is displayed on the picked-up image display panel 600. Note that, in this case, the face-region highlight rendering unit 309 changes the form and/or color or the like of the highlight indication for the degree of the detection likelihood that was used to detect a face region, whereby the degree of the detection likelihood that was used to detect the face region can be displayed for the user.

Then, the process returns to step S803, and, in step S803, the picked-up image checking apparatus 101 waits for an event.

When the threshold update button 604 is pressed in step S803, the shooting-scene setting-value determination unit 303 calculates a new setting value that is determined on the basis of the current setting value and on the basis of a newly set threshold in step S811. In this case, the shooting-scene setting-value determination unit 303 sets the average of the current setting value and the newly set threshold as the new setting value.

Then, in step S812, for example, the shooting-scene setting unit 302 sets the new setting value that was calculated in step S811 as a setting value (a shooting parameter) for a corresponding shooting scene.

When an image pickup finish button 607 is pressed in step S803, the picked-up image checking apparatus 101 terminates the process illustrated in FIG. 8.

As described above, according to the embodiment of the present embodiment, detection of a face region can be performed using a threshold of the likelihood of detecting a face region that is suitable for a shooting scene.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-256861, filed Oct. 1, 2008, which is hereby incorporated by reference herein in its entirety.

The invention claimed is:

1. An image processing apparatus comprising:
a setting unit configured to set, in accordance with a user input, a shooting scene and shooting parameters for each image pickup apparatus that is to be used to pick up an image;
a receiving unit configured to receive a picked-up image from an image pickup apparatus;
an obtaining unit configured to obtain an instruction from the user for updating a threshold of a likelihood of detecting a face region;
an updating unit configured to update, in accordance with the shooting scene that is set by the setting unit for an image pickup apparatus which has picked up the image received by the receiving unit, a threshold of a likelihood of detecting a face region that is included in the shooting parameters for the shooting scene based on a current value of the threshold and the instruction obtained from the user;
a detection unit configured to detect a face region from the received picked-up image using the updated threshold of the likelihood of detecting a face region; and
a display unit configured to display an image of the face region which is detected by the detection unit so that the image of the face region is discriminated.

2. The image processing apparatus according to claim 1, further comprising an object moving unit configured to move, in accordance with the threshold of the likelihood of detecting a face region that is obtained by the detection unit, a slider object that is displayed on a display screen and that indicates a threshold of a likelihood of detecting a face region.

3. The image processing apparatus according to claim 2, further comprising a changing unit configured to change, when the slider object is moved in accordance with a user operation, the threshold of the likelihood of detecting a face region in accordance with a position of the moved slider object, wherein the detection unit detects a face region from the picked-up image using the threshold of the likelihood of detecting a face region that is changed by the changing unit.

4. The image processing apparatus according to claim 1, wherein the display unit highlights and displays, on a display screen, an image of the face region that is detected by the detection unit.

5. The image processing apparatus according to claim 1, further comprising a calculation unit configured to calculate, when a threshold of the likelihood of detecting a face region is newly set as a current threshold of the likelihood of detecting a face region by pressing a button object for changing the threshold of the likelihood of detecting a face region in accordance with a user operation, a new threshold of the likelihood of detecting a face region that is determined on the basis of a previous threshold of the likelihood of detecting a face region, the previous threshold of the likelihood of detecting a face region being set prior to the current threshold of the likelihood of detecting a face region, and on the basis of the current threshold of the likelihood of detecting a face region,
wherein the setting unit sets, as a shooting parameter for a corresponding shooting scene, the new threshold of the likelihood of detecting a face region that is calculated by the calculation unit.

6. The image processing apparatus according to claim 1, wherein the display unit displays, on a display screen in accordance with the number of face regions that are detected by the detection unit, the number of persons in the picked-up image.

7. An image processing method comprising:
- setting, in accordance with a user input, a shooting scene and shooting parameters for each image pickup apparatus that is to be used to pick up an image;
- receiving a picked-up image from an image pickup apparatus;
- obtaining an instruction from the user for updating a threshold of a likelihood of detecting a face region;
- updating, in accordance with the shooting scene that is set for an image pickup apparatus which has picked up the image that is received, a threshold of a likelihood of detecting a face region that is included in the shooting parameters for the shooting scene based on a current value of the threshold and the instruction obtained from the user;
- detecting a face region from the received picked-up image using the updated threshold of the likelihood of detecting a face region; and
- displaying an image of the detected face region so that the image of the face region is discriminated.

8. A non-transitory computer-readable storage medium that stores a program for instructing a computer to implement the image processing method according to claim 7.

* * * * *